United States Patent

[11] 3,558,940

| [72] | Inventors | Benjamin F. Chestnut;<br>Stephen F. Murray, Indianapolis, Ind. |
|---|---|---|
| [21] | Appl. No. | 775,284 |
| [22] | Filed | Nov. 13, 1968 |
| [45] | Patented | Jan. 26, 1971 |
| [73] | Assignee | P. R. Mallory & Co., Inc.<br>Indianapolis, Ind.<br>a corporation of Delaware |

[54] SYNCHRONOUS MOTOR WITH DIRECTIONAL CONTROLS
14 Claims, 6 Drawing Figs.

[52] U.S. Cl............................................. 310/41,
310/156, 310/257, 310/83
[51] Int. Cl..................................................... H02k 7/118,
H02k 21/08
[50] Field of Search........................................... 310/41,
156, 162—165, 257

[56] References Cited
UNITED STATES PATENTS

| 3,427,485 | 2/1969 | Dotto | 310/164 |
| 3,448,306 | 6/1969 | Murray | 310/162X |
| 2,972,687 | 2/1961 | Kohler | 310/41 |
| 3,225,874 | 12/1965 | Woolley | 192/4 |
| 3,308,315 | 3/1967 | Mahon et al. | 310/41 |
| 3,350,589 | 10/1967 | Svarnias | 310/41X |
| 3,354,993 | 11/1967 | Van Der Lely | 310/41X |

FOREIGN PATENTS

| 550,809 | 1/1943 | Great Britain | 310/41 |
| 1,022,900 | 3/1966 | Great Britain | 310/41 |

*Primary Examiner*—W. E. Ray
*Attorneys*—Richard H. Childress, Robert F. Meyer and Henry W. Cummings

ABSTRACT: The combination of a synchronous motor and a one-way device which includes a cam and pawl arrangement provides a synchronous motor which is easily started in a predetermined direction, with the stator arrangement further providing a smoothly running motor. The combination further includes a detachable gear train means which when connected to the coil bobbin of the motor, the pinion of the motor is automatically and predeterminately aligned with the input gear of the gear train.

PATENTED JAN 26 1971
3,558,940
SHEET 1 OF 2
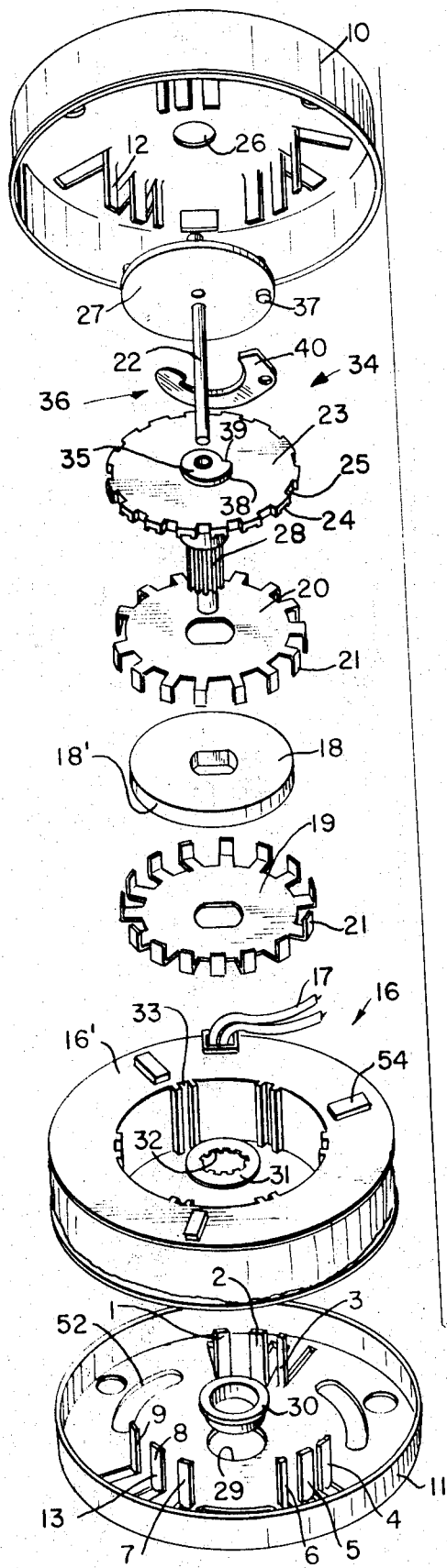
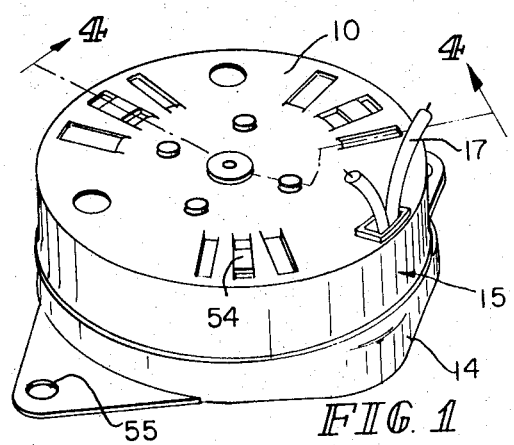
FIG. 1
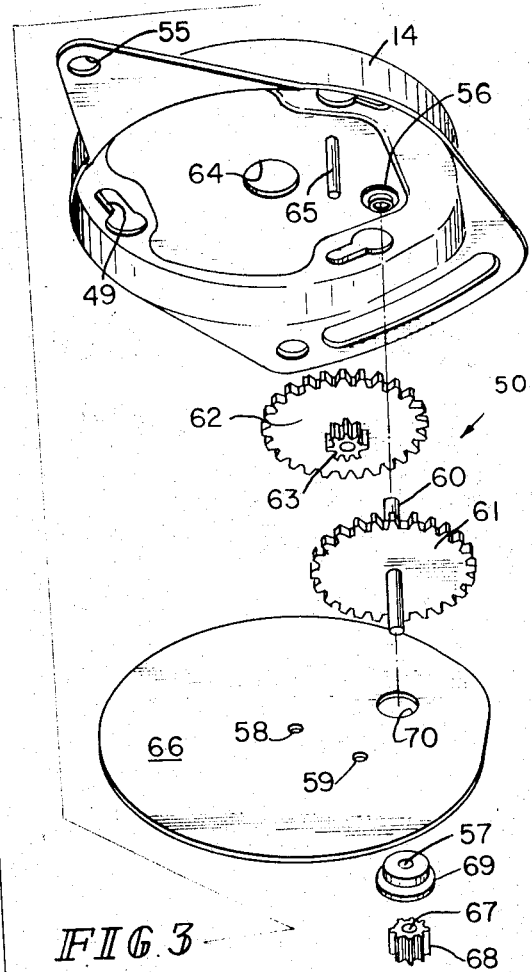
FIG. 3
FIG. 2
INVENTORS
STEPHEN F. MURRAY
BENJAMIN F. CHESTNUT
BY Robert S Meyer
ATTORNEY 3,558,940

INVENTORS
STEPHEN F. MURRAY
BENJAMIN F. CHESTNUT
BY *Robert S. Weyer*
ATTORNEY

SYNCHRONOUS MOTOR WITH DIRECTIONAL CONTROLS

A multitude of applications for synchronous motors of the type using a permanent magnet rotor are known. Some of the applications for synchronous motors are as a drive means for timing devices such as electric clocks and the like, and as a drive means for sequence timers such as the type used with washing machines, dishwashers, dryers and the like.

One of the problems associated with synchronous motors having permanent magnet rotors is that the rotors will run in either a clockwise or counterclockwise direction when current is applied. Thus, the motor drive shaft could be driven in a direction counter to what is desired. Such indiscriminate turning of the rotor is inherent in the structure of the motor itself. The relationship between the magnet, the coil used to energize the magnet, and the relationship of the stator poles inherently causes the rotor to indiscriminately turn in either a clockwise or counterclockwise direction. Since this problem is inherently built into the motor, industry has devised various means and methods of reversing the direction of the rotor's rotation when the motor is started in the wrong direction.

One of the principle problems associated with providing the means and method of reversing the direction of rotation is that of insuring that the motor will quickly and easily start in the right direction once it has been stopped. More particularly, it has been found that the rotor of the motor must be stopped at a predetermined position in order to insure a quick, smooth start in the right direction.

Another problem that is associated with providing the means and method for reversing the direction of a rotor is that of insuring that the rotor does not miss or bypass the means for reversing its direction. Another problem that is associated with the provision of means and methods for reversing the motor's direction is in the ability of the means to overcome the mass or the load of the rotor to very quickly start the motor in the right direction.

In addition to the directional starting problem many synchronous motors of the type having permanent magnet rotors will not always start when current is applied under certain conditions. Usually, this malfunction is caused by an equilibrium condition between the forces tending to rotate the rotor in one direction and equal and opposing forces tending to rotate the rotor in the opposite direction. The probability of such an occurence is greatly increased if the magnetic structure is symmetrical. Any asymmetry, such as various gaps between rotor and stator poles, various pitches between the rotor poles, various permanent magnet irregularities, etc., all enhance the probability of the motor starting when current is applied. However, the problem is to create an asymmetrical condition which will always start the motor but which will not impair the running characteristics of the motor.

Synchronous motors have a high r.p.m. output which must be reduced significantly, if the motor is to be used in applications such as a sequence timer. The generally accepted practice is to reduce the output speed of the motor by interposing a gear reduction means between the output of the motor and the input of the sequence timer. Generally, the gear train cooperatively associated with the pinion of the motor is incorporated within the housing retaining the motor. It is seen that the general construction of the motor necessitates replacement of the entire motor assembly if any one of the gear teeth of the gear train becomes crowned or reaches the end of the useful life through some other type of failure. In addition, it is apparent that if one desires to alter the gear reduction of the gear train so as to achieve, for example, a higher output speed, the entire motor assembly must be replaced rather than merely replacing the inexpensive gear train which is the source of difficulty. It can readily be seen therefore, that a detachable gear train would be desirable. However, in using a detachable gear train, the problem arises as to insuring that the gear train is mounted such that the input gear is accurately aligned with the motor pinion in an easy manner.

Accordingly, it is an object of the present invention to provide a synchronous motor having a combination of elements which substantially eliminates the aforementioned difficulties.

Another object of the invention is to provide the combination of a one-way directional device in conjunction with a motor arrangement such that the wrong-way directional rotation of the motor will be stopped at a predetermined position.

Another object of the invention is to provide a one-way directional device having a programming means responsive to the rotor of a synchronous motor.

Still another object of the invention is to provide a one-way directional device for a synchronous motor wherein the programming means includes a cam connected to the rotor of the motor.

A further object of the invention is to provide a one-way device for a synchronous motor wherein the device further includes a directional stop means cooperating with the programming means to stop the motor's wrong-way directional rotation at a predetermined position.

Yet another object of the invention is to provide a one-way directional device wherein the directional stop means includes a pawl mounted on a shell of the motor in a predetermined position so as to cooperate with the cam means to stop the wrong-way directional travel of the motor in a predetermined direction.

Still another object of the invention is to provide the combination of a one-way directional device in combination with a stator arrangement for a synchronous motor wherein the stator arrangement creates an asymmetrical condition which will always start the motor without impairing its running characteristics.

Another object of the invention is to provide a stator arrangement for a synchronous motor having stator poles disposed so as to create an unbalanced magnetic field for starting the motor.

A still further object of the invention is to provide the combination of a one-way directional device and a stator for a synchronous motor with a speed reduction means which is easily detachable from the motor.

Another object of the invention is to provide a speed reduction means which includes a detachable gear train means connected to the coil bobbin of the motor.

Another object of the invention is to provide the combination of a one-way directional device for a synchronous motor and a detachable gear train means which when connected to the coil bobbin of the motor automatically aligns the input gear of the detachable gear train to the drive pinion of the motor.

These and other objects and the nature thereof will become apparent from the following description taken in conjunction with the accompanying drawings wherein like reference numbers describe elements of a similar function.

In the drawings:

FIG. 1 is a perspective view of a synchronous motor employing the principle of the invention;

FIG. 2 is an exploded view of the synchronous motor;

FIG. 3 is an exploded view of the speed reduction means of the motor;

Figure 4:
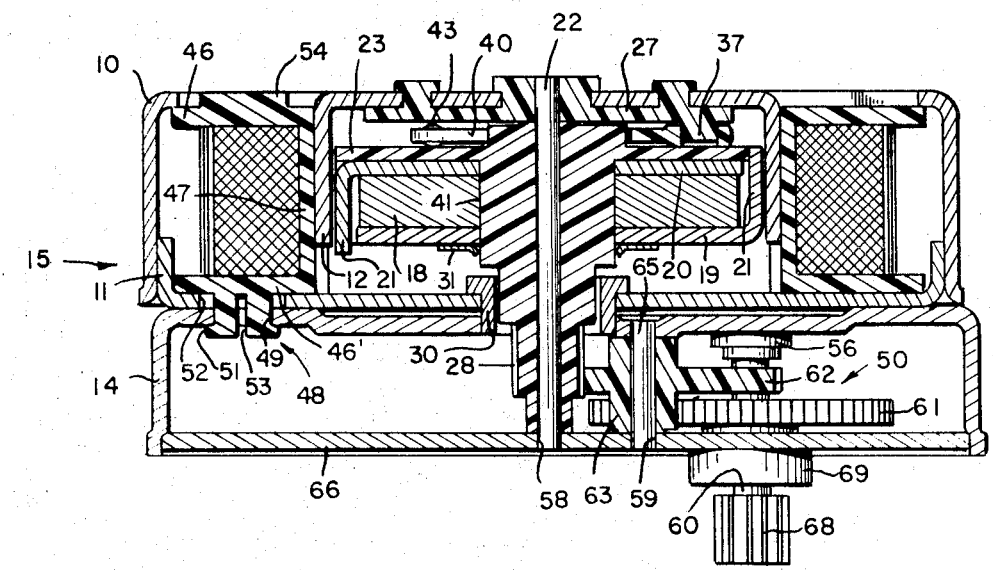
FIG. 4 is a section taken along line 4—4 of FIG. 1.

Generally speaking, the objects of the invention are accomplished by providing in combination, a one-way directional device and a stator-rotor pole arrangement for a self-starting permanent magnet motor having a permanent magnet rotor positioned in the aperture of a field coil, the rotor having alternate north and south poles. The one-way direction device includes programming means carried by the rotor and a stop means cooperatively associated with the programming means, the stop means disposed with respect to the rotor poles and the programming means so as to stop the rotor from a wrong-way directional rotation at a point of high oscillation. The stator poles are of varying arcuate widths such that the stator poles are staggered with respect to the rotor poles so as to create an unbalanced magnetic field in the stator-rotor arrangement.

The combination further includes a speed reduction means disposed outside the shell of the motor and connected to the bobbin of the field coil of the motor through stud means disposed so as to automatically align the drive pinion connected to the rotor shaft with the drive gear of the speed reducing means.

More particularly, the one-way directional device includes a cam means mounted on the rotor of the motor, and a stop means including a pawl pivotally mounted on the shell of the motor such that when the pawl engages the cam means, there will be a half-pole pitch between at least one adjacent pair of rotor poles and stator poles.

Referring now to the drawings, and particularly to FIGS. 1 and 2, the component parts of the present invention can be visualized in conjunction with the following description.

The motor of the present invention is retained in the top shell 10 and the bottom shell 11 which are held together to form a housing 15. The material for the shells 10 and 11 may be ordinary cold-rolled steel, preferably annealed. Integral poles 12 and 13 are formed by lancing radial strips out of the flat portions of the shells and forming them substantially parallel to the shell's center axis so as to extend above or below the rim of the shell. Included as part of the motor is a speed reducing means disposed in a shell 14 which is connected to the housing 15 in a manner hereinafter described.

The dimensions of the two shells 10 and 11 depend, of course, on the characteristics of the motor which is being constructed. For illustrative purposes, a specific motor will be described in the specification. The shells 10 and 11 of the illustrative embodiment are approximately 2 inches in diameter and one-quarter inch deep. The integral poles are formed with a radius of approximately five-eights of an inch and extends approximately one-eighth of an inch above or below the rim of the shell.

The poles that are formed in the shells constitute stator field poles for the motor of the present invention. In the illustrative embodiment, the poles are spaced in the following relationship. Viewing the shell 11 so that the poles 13 are pointing upward and proceeding clockwise, pole 01 is at 0° and is double width, pole 02 is at 24° and is double width, pole 03 is at 42° and is single width, pole 04 is at 120° and is double width, pole 05 is at 144° and is double width, pole 06 is at 162° and is single width, pole 07 is at 240° and is double width, pole 08 is at 264° and is double width, and pole 09 is at 282° and is single width. The poles of shell 10 will have the same angular positions when viewed so that the poles are pointing up and proceeding counterclockwise. When the two shells 10 and 11 are mounted face-to-face, the single width poles will occupy the space adjacent to each pair of double width poles on the opposite shell.

The purpose of staggering the poles' positioning and varying the width of the poles is to create an unbalanced magnetic field with respect to the rotor poles which will cause higher starting torque to give the motor good starting characteristics.

A coil 16 includes an insulating spool wound with a predetermined number of turns of wire. The coil is annularly disposed in the space between the ID of the shells 10 and 11 and the intermeshed ring of stator poles. In the illustrative embodiment, the coil 16 has approximately 5000 turns of 40 AWG enameled copper wire terminated by insulated stranded wire 17.

The rotor of the motor of the present invention includes a permanent magnet disc 18 sandwiched between two spiders 19 and 20. Each of the two spiders 19 and 20 have integral legs 21 formed parallel to the center axis of the spiders so as to intermesh alternately with the legs of the opposite spider. The spiders may be formed of ordinary cold-rolled steel, preferably annealed. The permanent magnet disc 18 is magnetized so that one face is north and the opposite face is south. Thus, the spider legs are magnetized correspondingly so that the periphery of the rotor contains a predetermined number of salient poles magnetized alternately north and south. In the illustrative embodiment of the present invention, each of the spiders 19 and 20 have fifteen legs. Thus, the rotor has 30 salient poles magnetized alternately north and south.

It should be understood that the invention need not be limited to the above described spider arrangement. For example, disc 18 could be polarized such that there would be alternate north and south poles formed on the peripheral face 18' of the disc.

The two spiders 19 and 20 and the permanent magnet disc 18 are pressed over a shaft 22 onto a bearing member 23 and are retained by spring slip 31 through teeth 32 engaging boss 41. Member 23 includes notches 24 and 25 formed in its outer periphery for receiving legs 21 of the spiders 19 and 20. Shaft 22 is rotatably journaled in shell 10 through aperture 26 with member 27 serving as a bearing member. Shaft 22 includes a drive pinion 28 which extends through aperture 29 in shell 11. The shaft 22 is rotatably journaled in shell 11 through bearing 30. The bobbin 16' of coil 16 includes a plurality of grooves 33 for insuring proper alignment of the stator poles 12 and 13.

When the motor is first energized the rotor can "take off" in either a clockwise or counterclockwise direction due to the structural relationship between the coil, the magnet, and the stator and rotor poles. With particular reference to FIGS. 2, and 4–6 this problem has been solved by the one-way directional means 34. One-way directional means 34, in general, includes a programming means including cam means 35 carried by bearing member 23 and directional stop means 36 pivotally carried by bearing member 27 through boss 37. Cam means 35 includes an increasing rise contour 38 terminating in a step 39 to form a stop face. Such face cooperatively engages the directional stop means 36 to stop the rotor from its wrong direction rotation at a predetermined position.

Directional stop means 36 is pivotally mounted on shell 10 through boss 37 which is formed as part of bearing member 27. Bearing member 27 aids in positioning the directional stop means with respect to cam means 35. As shown, directional stop means 36 takes the form of a pawl 40 having two arms 40' and 40", the arms forming a partially enclosed circular track 42 for the cam means 35 to run in. Means such as bosses 43 prevents the entire underneath face of the pawl from sliding on the bearing member 27 to thus facilitate free movement of the pawl. The use of the partially enclosed circular track for the cam means allows the rotor itself to be in contact with the directional stop means for approximately 280° of the full rotational displacement of the rotor. Because of this feature, strict control of the cooperation between the cam means and the directional stop means is provided to thus substantially eliminate the possibility of a miss or malfunction due to failure of the rotor cam means to engage the directional stop means. Included as part of the pawl are two stop means formed by faces 44 and 45 at the ends of the arms 40' and 40". It is seen the face 44 is formed as a "hook" at the end of the pawl. The use of two stop faces is a desirable feature in that it restricts the movement of the rotor when it starts in the wrong direction. Although it is a desirable feature, the use of two stop means is not essential, it being contemplated that the signal stop face 44 could be used.

Figure 5:
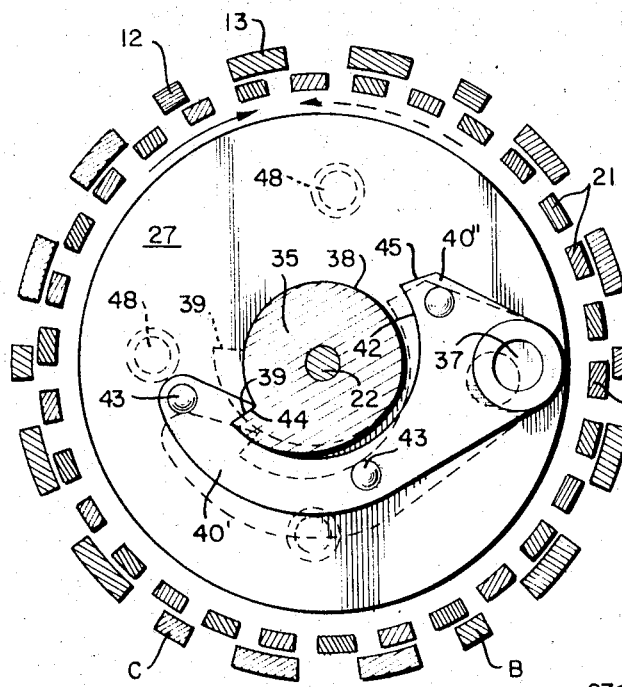
FIG. 5 is an isolated view of the motor showing the relationship of the one-way directional device in relation to the stator and rotor poles of the motor.

As previously noted, when the rotation of the motor has been stopped from its wrong-way directional travel, it does not easily start in the right direction if the rotation is stopped in the wrong position. It has been found that this is due to the motor being stopped, when it is travelling in the wrong direction, in a position of low oscillation. The present invention overcomes this difficulty by having a one-way directional means which stops the rotor in a predetermined position of high oscillation. More specifically, the present invention stops the rotor from its wrong direction travel by stopping the rotor at a half-pole pitch, or, to put it another way, the rotor is stopped such that at least one of the salient poles 21 of the rotor about halfway overlaps one of the stator poles 12 or 13 of the motor. That is, generically speaking to achieve a half-pole pitch, at least one of the rotor poles should about halfway overlap at least one of the directionally opposite stator poles. This is accomplished through proper location of the pivot point of the pawl 40 with respect to the location of the stop face formed as step 39 of cam means 35. With particular reference to FIG. 5, it is noted that there are three poles A, B, C formed from shell 10 of less width than the other poles within the arc segment between A and C. In order to stop the rotor in the aforementioned predetermined position, the poles of the rotor are set for a half-pole pitch with respect to the stator poles as shown in FIG. 5, and the pivot point of the pawl is located. Then the cam means is programmed such that upon engagement with the pawl, the rotor will be stopped at the predetermined position. In the present embodiment, the location of the pivot point of the pawl with respect to the cam may be described as follows: the pivot point of the pawl should be located on a line which bisects one of the poles, A, B, or C and which extends through the center or axis of the motor; and the angle formed between the intersection of a plane formed by the extension of the plane of face 44 and stop face of the step 39 of the cam and the aforementioned line should be from about 115—125°, with about 120° being preferred. When the rotor is stopped in this position, all of the poles of the rotor will be staggered with respect to the stator poles and the rotor will be stopped at a position of high oscillation.

The semicircular track is further programmed such that when the arm 40' is biased away from the cam, the face of step 39 of the cam will engage the face 45 of the pawl at an angle which is from about 40—44° with about 42° being preferred from the line running through the center or axis of the motor and the pawl pivot point.

Figure 6:
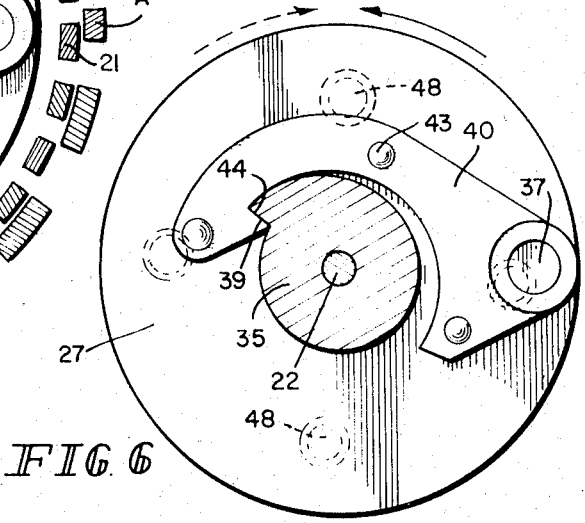
FIG. 6 is a top view of the one-way directional device in an alternative embodiment.

FIG. 6 illustrates a mirror image of the directional means of FIG. 5 for a motor designed to rotate in a direction opposite that of FIG. 5. As such the relationship of the pawl with respect to the cam will essentially be the same in FIG. 6 as in FIG. 5.

Referring now to FIGS. 5 and 6, the operation of the motor, and in particular, the one-way directional device can now be described. When power is supplied to the motor, the field coil will set up magnet forces between the stator and rotor poles. Due to the positioning of the stator poles, there will be an unbalanced magnetic field, thus causing the rotor to begin rotation. With particular reference to FIG. 5, the one-way directional means is designed for a motor adapted to rotate in a counterclockwise direction. With the rotor turning in the desired counterclockwise direction, cam means 35 will continually displace the pawl 40 as the cam means 35 rotates past the end portion of the pawl having the stop face 44. If the rotor starts to turn in the wrong direction, that is, clockwise, one of two conditions can exist. If when the rotor starts in the wrong direction the pawl 40 is in the position shown by the solid line, the rotor would continue to rotate in the wrong direction until stop face 44 engages the stop face formed by the step 39 of the cam. If, on the other hand, the pawl is in the position shown by the dotted portion, then the rotor would continue to travel in the wrong direction until the stop face of the cam engages stop face 45 of the pawl.

Another advantage that is gained through the use of the present one-way directional device is the resiliency of the directional stop means 36. When the rotor starts in the wrong direction, it mechanically cams the directional stop means into a stop position. Due to the geometry of the system, at the moment of impact between the pawl 40 and the cam means 35, the pawl loads or flexes under the force of the rotor. When the rotor comes to an absolute stop, then the stored energy in the pawl overcomes the mass of the rotor and propels it in the opposite or desired direction.

Referring now to FIGS. 2 and 4, the detachable speed reducing means and its relation to the bobbin 16' of the rotor assembly can be described. The bobbin 16' may be fabricated from any suitable thermoplastic material such as polycarbonate and the like. In addition, the bobbin may be fabricated from thermosetting type resins and plastics such as phenolics and the like. The bobbin includes a tubular section 47 terminating in flanges 46 and 46', integral mounting stud or leg means 48 equally spaced about flange 46' and projecting therefrom, and the aforementioned rib means 33.

The mounting stud means 48 are integrally formed with the bobbin 16' and project therefrom in substantially the same direction. It is seen that the mounting studs have an axis that is in substantially spaced parallel relationship with respect to the major axis of the bobbin. It should be noted that the mounting stud means are fabricated from the same plastic material as is the bobbin. The shape of the mounting stud means 48 is such so as to afford smooth entry of the stud into keyhole-shaped apertures 49 in shell 14 which serves as a portion of the housing of the gear train means 50 shown in FIG. 4. The stud interfits with the reduced portion of the keyhole-shaped aperture upon the application of a moderate pressure which arcuately displaces the motor with respect to the gear train assembly. The leading edge of each stud includes a flange or shoulder portion 51 which projects through cooperatively associated apertures 52 of the shell 11 and engages with the underside of the shell 14 housing the gear train means. Note that the apertures 52 are equally spaced from one another. The stud means 48, illustrated in FIG. 4, includes a double D-shaped cross section to facilitate subsequent locking thereof with the underside of the shell 11. Note that a channel 53 separates the respective sections of the stud.

Although the stud means shown in FIG. 4 includes a substantially flat shoulder portion, it will be understood that the stud means may include leading edges which are chamfered or rounded or angulated so as to be compressed as the leading edge enters and progresses through the aperture in the mounting chassis thereby facilitating entrance of the stud into the cooperating aperture in the housing of the gear train means. Upon exit of the leading edge of the stud through the cooperatively associated aperture in the gear train housing, the stud will expand to its normal position and the flanged edge will engage the underside of the housing thereby effectively locking the motor to the gear train means.

The aforementioned integral mounting studs do not require the use of ancillary hardware or special tools in securing the same to the housing of the gear train means. It should be seen that the embodiment in FIG. 4 is substantially complete in and of itself as far as the locking feature is concerned. The integral mounting studs may be modified so as to be adaptable to several purposes such as including more studs and/or larger studs for mounting larger motors to the gear train.

Boss means 54 are equally spaced about the flange 46 of the bobbin and serve the functions of predeterminately positioning the bobbin with respect to shell 10 and of absorbing a high percentage of the compressive and shear stress forces exerted on the bobbin.

FIG. 3 illustrates an exploded isometric view of the gear train means 50 substantially enclosed by shell 14. Shell 14 includes oppositely projecting mounting ears 55. As previously noted, the major surface of the shell 14 includes a plurality of keyhole slots 49 pierced near the periphery thereof and spaced equally from one another. The keyhole slots 49 are used to receive and lock with the stud means 48 of the bobbin means as shown in FIG. 4. A bearing 56 is staked to the inside base of shell 14. A first shaft 60 is pressed through a first gear 61. A second shaft 65 is pressed through a second gear 62 and a pinion 63. A base plate 66 for the shell 14 has first and second perforations 58 and 59 and a hole 70 which accepts a bushing 69 and is staked in place. Perforations 58 and 59 serve as bearing surfaces for shafts 22 and 65 respectively. Shaft 60 passes freely through hole 57 of the bushing and is press-fitted into hole 67 of pinion 68. The hole 64, in the axial center of shell 14, is a pilot hole which assists in providing accurate alignment between the pinion of the drive motor and the input gear of the gear train means.

It is seen, therefore, that the speed reduction means of the present invention is readily replaceable merely by displacing the studs 48 from the shell 11. Also the drive gear 62 of the gear train is accurately aligned with the pinion 28 of the shaft of the rotor of the motor.

Thus there is described a synchronous motor wherein the combination of the stator pole arrangement with respect to the rotor arrangement and the one-way directional means affords a smooth running motor which is easily started in a predetermined directional rotation from a wrong direction rotation. The combination also includes a replaceable speed reduction means which is accurately aligned with the pinion carried by the shaft of the motor's rotor.

We claim:

1. In combination, a synchronous motor and a one-way directional means, said synchronous motor including a rotor having rotor poles, said directional means including cam programming means carried by said rotor and a pawl, said pawl including two arms to provide a substantially semienclosed circular track for said cam programming means to run in, said pawl disposed with respect to said rotor poles and said cam programming means so as to stop said rotor from a wrong-way directional rotation at a point of high oscillation.

2. The combination according to claim 1, wherein said cam programming means includes at least one stop face adapted to engage said pawl when said rotor is turned to said point of high oscillation.

3. The combination according to claim 1, wherein said pawl is resilient.

4. The combination according to claim 1, wherein said semienclosed circular track provides contact with said cam programming means for approximately 280° of the full rotational displacement of said rotor.

5. In combination, a synchronous motor and a one-way directional means, said synchronous motor and a one-way directional means, said synchronous motor including a shell, a rotor having rotor poles, and cooperating stator pole groups, each of said stator pole groups including at least two poles, the width of at least one of said poles being less than the width of the other stator poles in said group, said one-way directional means including cam programming means carried by said rotor and stop means cooperatively engaging said cam programming means, said stop means pivotally mounted on a line drawn through the axis of said motor and a stator pole of less width, said stop means engaging said cam programming means so as to stop said rotor from a wrong-way directional rotation when at least one of said rotor poles about halfway overlaps at least one of said stator poles.

6. The combination according to claim 5, wherein said stop means is a pawl pivotally mounted on said shell, said pawl having at least one stop face adapted to engage said cam programming means.

7. The combination according to claim 5, wherein said cam programming means includes at least one stop face adapted to engage said directional stop means when at least one of said rotor poles overlaps at least one of said stator poles.

8. The combination according to claim 6, wherein said pawl is resilient.

9. The combination according to claim 6, wherein said pawl includes two arms to provide a substantially semienclosed circular track for said cam programming means to run in.

10. The combination according to claim 9, wherein said semienclosed circular track provides contact with said cam programming means for approximately 280° of the full rotational displacement of said rotor.

11. The combination according to claim 5, wherein said cam programming means engages said stop means at a position where the angle formed by the intersection of the plane of their engaging faces with said line is from about 115° to about 125°.

12. The combination according to claim 11 wherein said angle is about 120°.

13. The combination according to claim 5 wherein said cam programming means engages said stop means at a position where the angle formed by the intersection of the plane of their engaging faces with said line is from about 40—44°.

14. The combination according to claim 13 wherein said angle is about 42°.